(12) United States Patent
Coulson

(10) Patent No.: US 9,617,353 B2
(45) Date of Patent: Apr. 11, 2017

(54) METHOD FOR PROTECTING AN ELECTRICAL OR ELECTRONIC DEVICE

(75) Inventor: Stephen Coulson, Abingdon (GB)

(73) Assignee: PZi Limited (GB)

( * ) Notice: Subject to any disclaimer, the term of this patent is extended or adjusted under 35 U.S.C. 154(b) by 841 days.

(21) Appl. No.: 12/161,181

(22) PCT Filed: Jan. 19, 2007

(86) PCT No.: PCT/GB2007/000149
§ 371 (c)(1),
(2), (4) Date: Sep. 12, 2008

(87) PCT Pub. No.: WO2007/083122
PCT Pub. Date: Jul. 26, 2007

(65) Prior Publication Data
US 2010/0189914 A1    Jul. 29, 2010

Related U.S. Application Data

(60) Provisional application No. 60/762,242, filed on Jan. 26, 2006.

(30) Foreign Application Priority Data

Jan. 20, 2006 (GB) .................................. 0601117.5

(51) Int. Cl.
| B05D 7/00 | (2006.01) |
| C08F 2/46 | (2006.01) |
| C09D 4/00 | (2006.01) |
| C08F 2/52 | (2006.01) |
| B05D 1/00 | (2006.01) |
| B05D 5/08 | (2006.01) |
| C08F 220/24 | (2006.01) |

(52) U.S. Cl.
CPC .................. *C08F 2/52* (2013.01); *B05D 1/62* (2013.01); *B05D 5/083* (2013.01); *C08F 220/24* (2013.01); *C09D 4/00* (2013.01)

(58) Field of Classification Search
CPC ... B05D 1/62; B05D 5/083; C08F 2/52; C08F 220/24
USPC ......................................... 427/488, 490, 535
See application file for complete search history.

(56) References Cited

U.S. PATENT DOCUMENTS

| 4,649,071 A | | 3/1987 | Tajima et al. | |
| 5,041,304 A | | 8/1991 | Kusano et al. | |
| 5,147,822 A | * | 9/1992 | Yamazaki et al. | ............ 438/127 |
| 5,420,570 A | | 5/1995 | Leitten et al. | |
| 5,463,010 A | | 10/1995 | Hu et al. | |
| 5,923,964 A | | 7/1999 | Li | |
| 6,066,399 A | * | 5/2000 | Hirano | .................. C23C 16/029 427/249.1 |
| 6,214,423 B1 | | 4/2001 | Lee et al. | |
| 6,551,950 B1 | * | 4/2003 | Badyal et al. | .................. 442/79 |
| 2004/0046165 A1 | * | 3/2004 | Hunze et al. | .................... 257/13 |
| 2004/0086717 A1 | * | 5/2004 | Sasaki et al. | ............. 428/411.1 |

FOREIGN PATENT DOCUMENTS

| EP | 0896035 A2 | 2/1999 |
| EP | 1557489 A1 | 7/2005 |
| GB | 2364463 | 1/2002 |
| JP | 54-153926 | 12/1979 |

(Continued)

OTHER PUBLICATIONS

English translation of SU-1158634A, B.L. Gorberg et al., filed Feb. 2, 1983.
Farsari, E.; Kostopoulou, M.; Amanatides, E. et al. Conference: 11th High-Tech Plasma Processes Conference (HTPP) Location: Brussels, Belgium Date: Jun. 27-Jul. 2, 2010, Journal of Physics D-Applied Physics, vol. 44, Issue: 19, Article No. 194007, published: May 18, 2011.
Okeefe, MJ; Rigsbee, JM, Influence of Substrate Material and Ion-Bombardment on Plasma-Deposited Fluorocarbon Thin-Films, Journal of Applied Polymer Science, vol. 53, Issue: 12, pp. 1631-1638, published: Sep. 19, 1994.

(Continued)

*Primary Examiner* — Dah-Wei D Yuan
*Assistant Examiner* — Kristen A Dagenais
(74) *Attorney, Agent, or Firm* — Freeman Intellectual Property Law LLC

(57) ABSTRACT

A method for protecting an electrical or electronic device against liquid damage, the method comprising a preliminary step of applying a continuous power plasma to the electrical or electronic device, followed by exposing the device to pulsed plasma comprising a compound of formula (I)

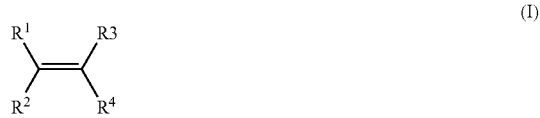

where $R^1$, $R^2$ and $R^3$ are independently selected from hydrogen, alkyl, haloalkyl or aryl optionally substituted by halo; and $R^4$ is a group X—$R^5$ where $R^5$ is an alkyl or haloalkyl group and X is a bond; a group of formula $C(O)O(CH_2)_nY$ where n is an integer of from 1 to 10 and Y is a bond or a sulphonamide group; or a group $(O)_p R^6 (O)_q (CH_2)_t$ where $R^6$ is aryl optionally substituted by halo, p is 0 or 1, q is 0 or 1 and t is 0 or an integer of from 1 to 10, provided that where q is 1, t is other than 0, for a sufficient period of time to allow a polymeric layer to form on the surface of the electrical or electronic device. Devices protected by this method are protected from contamination by liquids, in particular environmental liquids.

21 Claims, No Drawings

(56) References Cited

FOREIGN PATENT DOCUMENTS

| | | |
|---|---|---|
| JP | 61-169100 | 7/1986 |
| JP | 2003-066203 | 3/2003 |
| JP | 2009-523914 | 6/2009 |
| KR | 20020079694 A * | 10/1992 |
| SU | 1158634 A * | 5/1985 |
| WO | WO-98/58117 A1 | 12/1998 |
| WO | WO-01/03468 A2 | 1/2001 |
| WO | WO-02/28548 A2 | 4/2002 |
| WO | WO-03/097245 A2 | 11/2003 |
| WO | WO-03/101621 A2 | 12/2003 |
| WO | WO-2005/089961 A1 | 9/2005 |

OTHER PUBLICATIONS

Translation of JPO Office Action in JP Application 2008-550843, mailing date May 15, 2012.
O'Keefe, MJ, Rigsbee, JM; Influence of Substrate Material and Ion-Bombardment on Plasma-Deposited Fluorocarbon Thin-Films, J. Applied Polymer Sci, vol. 53, Iss. 12, pp. 1631-1638, pub. Sep. 19, 1994.

* cited by examiner

METHOD FOR PROTECTING AN ELECTRICAL OR ELECTRONIC DEVICE

RELATED APPLICATIONS

This application is a national stage application under 35 U.S.C. §371 of PCT/GB2007/000149, filed Jan. 19, 2007, which claims priority of United Kingdom application 0601117.5, filed Jan. 20, 2006 and U.S. provisional application 60/762,242, filed Jan. 26, 2006, each of the foregoing of which is incorporated by reference in its entirety.

BACKGROUND OF THE INVENTION

It is well known that electronic and electrical devices are very sensitive to damage caused by contamination by liquids such as environmental liquids, in particular water. Contact with liquids, either in the course of normal use or as a result of accidental exposure, can lead to short circuiting between electronic components, and irreparable damage to circuit boards, electronic chips etc.

The problem is particularly acute in relation to small portable electronic equipment such as mobile phones, pagers, radios, hearing aids, laptop, notebook, palmtop computers and personal digital assistants (PDAs), which can be exposed to significant liquid contamination when moved outside. In addition, they are prone to accidental exposure to liquids, for example if dropped or splashed.

In addition, other types of electronic or electrical devices are particularly prone to for example, environmental damage because of their location, for example outdoor lighting systems, radio antenna and other forms of communication equipment.

However, most devices of this type are damaged by accidental spillage or the like. Particular examples may include desktop devices such as keyboards, or instrumentation for instance used in control rooms.

A particular problem arises in relation to devices which are used in sound reproduction and which utilise transducers such as loudspeakers, microphones, ringers and buzzers. These are particularly susceptible to damage by liquid contamination, either as a result of accidental exposure or from environmental factors such as rain or spray in use. In many cases, the membranes or diaphragms used in the devices, particularly the most economical ones, are liquid absorbent to some degree, and when exposed to water for example, will absorb considerable amounts. This affects the operability of the transducer significantly and the quality of the sound reproduction therefore suffers.

DESCRIPTION OF RELATED ART

Many microphones are provided with an open-pore foamed plastic enclosure surrounding the transducer. However, these must be gas permeable and they do not provide complete protection against liquid contamination.

In the past, this problem has been addressed by introducing further water protective measures in the microphones. In many cases, these comprise water-impermeable porous membranes such as polytetrafluoroethylene (PTFE) membranes (see for example WO/01/03468 or U.S. Pat. No. 5,420,570) into the device. In all cases, these membranes will reduce the sensitivity of the transducer and therefore have an adverse impact on sound quality.

In other cases, such as that described in GB 2,364,463, more rigid protective covers are provided, which are solid and holes into which pick-up devices are inserted. This solution is costly and complex and only suitable in certain limited situations.

BRIEF SUMMARY OF THE INVENTION

The present invention relates to novel products in the form of electronic or electrical devices, which are treated to protect them from liquid damage, for example from environmental damage in particular from water or other liquids, as well as to processes for their production.

Plasma deposition techniques have been quite widely used for the deposition of polymeric coatings onto a range of surfaces, and in particular onto fabric surfaces. This technique is recognised as being a clean, dry technique that generates little waste compared to conventional wet chemical methods. Using this method, plasmas are generated from organic molecules, which are subjected to an electrical field. When this is done in the presence of a substrate, the radicals of the compound in the plasma polymerise on the substrate. Conventional polymer synthesis tends to produce structures containing repeat units that bear a strong resemblance to the monomer species, whereas a polymer network generated using a plasma can be extremely complex. The properties of the resultant coating can depend upon the nature of the substrate as well as the nature of the monomer used and conditions under which it is deposited.

The applicants have found that by utilising a specific type of monomer under particular deposition conditions, electronic or electrical devices having highly liquid repellent nano-coatings thereon can be produced, which does not affect the efficacy of the device.

DETAILED DESCROPTION OF THE INVENTION

According to the present invention there is provided an electronic or electrical device having a polymeric coating, formed by exposing said device to pulsed plasma comprising a compound of formula (I)

(I)

where $R^1$, $R^2$ and $R^3$ are independently selected from hydrogen, alkyl, haloalkyl or aryl optionally substituted by halo; and $R^4$ is a group $X$—$R^5$ where $R^5$ is an alkyl or haloalkyl group and X is a bond; a group of formula —C(O)O(CH$_2$)$_n$Y— where n is an integer of from 1 to 10 and Y is a bond or a sulphonamide group; or a group —(O)$_p$R$^6$(O)$_q$(CH$_2$)$_t$— where $R^6$ is aryl optionally substituted by halo, p is 0 or 1, q is 0 or 1 and t is 0 or an integer of from 1 to 10, provided that where q is 1, t is other than 0, for a sufficient period of time to allow a protective polymeric layer to form on the surface of the electrical or electronic device.

As used herein, the expression "in a gaseous state" refers to gases or vapours, either alone or in mixture, as well as aerosols.

The expression "protective polymeric layer" refers to polymeric layers which provide some protection against liquid damage, and in particular are liquid (such as oil- and water-) repellent. Sources of liquids from which the devices are protected include environmental liquids such as water, and in particular rain, as well as any other oil or liquid, which may be accidentally spilled.

As used herein, the term "electronic or electrical device" refers includes any piece of electrical or electronic equipment which may be used, as well as components thereof such as printed circuit boards (PCBs), transistors, resistors, electronic components or semi-conductor chips. In particular however, the coating is applied to the outer surface of a fully assembled device, for example the fully assembled mobile phone, or microphone. In such cases, the polymer layer will be applied to, for example an outer casing or foam cover, as well as any exposed components such as control buttons or switches, so as to prevent any liquid reaching the components within.

The applicants have found that the polymer layer forms across the entire surface of the device, including where the device includes different substrate materials, such as a combination of different plastics (including foamed plastic), metals and/or glass surfaces, and surprisingly therefore, the entire device is made liquid repellent. Even where these are not in a water-tight relationship, for example push buttons on a mobile phone which are not fused to the surrounding casing, the polymer layer deposited in this way is sufficiently repellent to prevent liquids penetrating the device around the edge of the buttons into the device. Thus it has been found that mobile phones for example, which are generally very sensitive to liquid damage, can be fully immersed in water after the treatment of the invention, without any lasting harm.

As the coating is carried out without requiring immersion in any liquids, there is no risk to the operation of the device as a result of exposure to this procedure.

This broad applicability makes the present procedure particularly advantageous.

Particular examples of electrical and electronic devices include communications devices such as mobile phones and pagers, radios, and sound and audio systems such as loudspeakers, microphones, ringers or buzzers, hearing aids, personal audio equipment such as personal CD, tape cassette or MP3 players, televisions, DVD players including portable DVD players, video recorders, digi and other set-top boxes such as Sky, computers and related components such as laptop, notebook or palmtop computers, personal digital assistants (PDAs), keyboards, or instrumentation, games consoles in particular hand-held playstations and the like, or outdoor lighting systems.

Other particular examples may include electrical or electronic components which are particularly at risk of water contamination, such as those used in transport vehicles include aircraft and other transport equipment such as trains, automobiles in addition to other vehicles such as those used by the Military, and other devices such as washing machines and dishwashers.

In a particular embodiment, the electronic or electrical device is a microphone. By utilising the method defined above, highly advantageous microphones have been produced. In particular, the main features and benefits of using this approach are that by coating for example the casing in particular the foam cover of the microphone, the transducer is protected from liquid contamination without any loss of sound quality. Levels of protection equal to or better than those achieved using membranes are achieved without any resultant "muffling" of the sound quality, which is a feature of the use of such membranes.

When applied to the foam cover, the layer does not affect porosity of the foam. In other words, the layer is not sufficient to block the pores of the foam or to affect the air permeability in any way. However, the entire surface of the pores is made liquid repellent, and this is sufficient to ensure that liquids do not penetrate the foam.

However, similar advantages occur in relation to devices which incorporate small microphones such as communications devices and sound and audio systems as defined above, and in particular mobile phones, where coating of the finished phone may further enhance the levels of protection.

Electronic or electrical devices treated in this way are protected to a significant degree, against water and oil damage.

Precise conditions under which the plasma polymerization takes place in an effective manner will vary depending upon factors such as the nature of the polymer, the electrical or electronic device etc. and will be determined using routine methods and/or the techniques.

Suitable plasmas for use in the method of the invention include non-equilibrium plasmas such as those generated by radiofrequencies (Rf), microwaves or direct current (DC). They may operate at atmospheric or sub-atmospheric pressures as are known in the art. In particular however, they are generated by radiofrequencies (Rf).

Various forms of equipment may be used to generate gaseous plasmas. Generally these comprise containers or plasma chambers in which plasmas may be generated. Particular examples of such equipment are described for instance in WO2005/089961 and WO02/28548, the content of which is incorporated herein by reference, but many other conventional plasma generating apparatus are available.

In general, the item to be treated is placed within a plasma chamber together with the material to be deposited in gaseous state, a glow discharge is ignited within the chamber and a suitable voltage is applied, which may be pulsed.

The gas used within the plasma may comprise a vapour of the monomeric compound alone, but it may be combined with a carrier gas, in particular, an inert gas such as helium or argon. In particular helium is a preferred carrier gas as this can minimises fragmentation of the monomer.

When used as a mixture, the relative amounts of the monomer vapour to carrier gas is suitably determined in accordance with procedures which are conventional in the art. The amount of monomer added will depend to some extent on the nature of the particular monomer being used, the nature of the laboratory disposable being treated, the size of the plasma chamber etc. Generally, in the case of conventional chambers, monomer is delivered in an amount of from 50-250 mg/min, for example at a rate of from 100-150 mg/min. Carrier gas such as helium is suitably administered at a constant rate for example at a rate of from 5-90, for example from 15-30 sccm. In some instances, the ratio of monomer to carrier gas will be in the range of from 100:1 to 1:100, for instance in the range of from 10:1 to 1:100, and in particular about 1:1 to 1:10. The precise ratio selected will be so as to ensure that the flow rate required by the process is achieved.

Alternatively, the monomer may be delivered into the chamber by way of an aerosol device such as a nebuliser or the like, as described for example in WO2003/097245 and WO03/101621, the content of which is incorporated herein by reference.

In some cases, a preliminary continuous power plasma may be struck for example for from 2-10 minutes for instance for about 4 minutes, within the chamber. This may act as a surface pre-treatment step, ensuring that the monomer attaches itself readily to the surface, so that as polymerisation occurs, the coating "grows" on the surface. The pre-treatment step may be conducted before monomer is introduced into the chamber, in the presence of only the inert gas.

The plasma is then suitably switched to a pulsed plasma to allow polymerisation to proceed, at least when the monomer is present.

In all cases, a glow discharge is suitably ignited by applying a high frequency voltage, for example at 13.56 MHz. This is suitably applied using electrodes, which may be internal or external to the chamber, but in the case of the larger chambers are internal.

Suitably the gas, vapour or gas mixture is supplied at a rate of at least 1 standard cubic centimeter per minute (sccm) and preferably in the range of from 1 to 100 sccm.

In the case of the monomer vapour, this is suitably supplied at a rate of from 80-300 mg/minute, for example at about 120 mg per minute depending upon the nature of the monomer, whilst the pulsed voltage is applied.

Gases or vapours may be drawn or pumped into the plasma region. In particular, where a plasma chamber is used, gases or vapours may be drawn into the chamber as a result of a reduction in the pressure within the chamber, caused by use of an evacuating pump, or they may be pumped or injected into the chamber as is common in liquid handling.

Polymerisation is suitably effected using vapours of compounds of formula (I), which are maintained at pressures of from 0.1 to 200 mtorr, suitably at about 80-100 mtorr.

The applied fields are suitably of power of from 40 to 500 W, suitably at about 100 W peak power, applied as a pulsed field. The pulses are applied in a sequence which yields very low average powers, for example in a sequence in which the ratio of the time on:time off is in the range of from 1:500 to 1:1500. Particular examples of such sequence are sequences where power is on for 20-50 μs, for example about 30 μs, and off for from 1000 μs to 30000 μs, in particular about 20000 μs. Typical average powers obtained in this way are 0.01 W.

The fields are suitably applied from 30 seconds to 90 minutes, preferably from 5 to 60 minutes, depending upon the nature of the compound of formula (I) and the electrical or electronic device etc.

Suitably a plasma chamber used is of sufficient volume to accommodate multiple electrical or electronic devices, in particular when these are small in size, for example up to 20,000 microphone heads can be processed at the same time with ease and much more is capably with the correct size equipment. A particularly suitable apparatus and method for producing electrical or electronic devices in accordance with the invention is described in WO2005/089961, the content of which is hereby incorporated by reference.

In particular, when using high volume chambers of this type, the plasma is created with a voltage as a pulsed field, at an average power of from 0.001 to 500 w/m$^3$, for example at from 0.001 to 100 w/m$^3$ and suitably from 0.005 to 0.5 w/m$^3$.

These conditions are particularly suitable for depositing good quality uniform coatings, in large chambers, for example in chambers where the plasma zone has a volume of greater than 500 cm$^3$, for instance 0.5 m$^3$ or more, such as from 0.5 m$^3$-10 m$^3$ and suitably at about 1 m$^3$. The layers formed in this way have good mechanical strength.

The dimensions of the chamber will be selected so as to accommodate the particular electrical or electronic device being treated. For instance, generally cuboid chambers may be suitable for a wide range of applications, but if necessary, elongate or rectangular chambers may be constructed or indeed cylindrical, or of any other suitable shape.

The chamber may be a sealable container, to allow for batch processes, or it may comprise inlets and outlets for electrical or electronic devices, to allow it to be utilised in a continuous process. In particular in the latter case, the pressure conditions necessary for creating a plasma discharge within the chamber are maintained using high volume pumps, as is conventional for example in a device with a "whistling leak". However it will also be possible to process certain items at atmospheric pressure, or close to, negating the need for "whistling leaks"

The monomers used are selected from monomers of formula (I) as defined above. Suitable haloalkyl groups for $R^1$, $R^2$, $R^3$ and $R^5$ are fluoroalkyl groups. The alkyl chains may be straight or branched and may include cyclic moieties.

For $R^5$, the alkyl chains suitably comprise 2 or more carbon atoms, suitably from 2-20 carbon atoms and preferably from 6 to 12 carbon atoms.

For $R^1$, $R^2$ and $R^3$, alkyl chains are generally preferred to have from 1 to 6 carbon atoms.

Preferably $R^5$ is a haloalkyl, and more preferably a perhaloalkyl group, particularly a perfluoroalkyl group of formula $C_mF_{2m+1}$ where m is an integer of 1 or more, suitably from 1-20, and preferably from 4-12 such as 4, 6 or 8.

Suitable alkyl groups for $R^1$, $R^2$ and $R^3$ have from 1 to 6 carbon atoms.

In one embodiment, at least one of $R^1$, $R^2$ and $R^3$ is hydrogen. In a particular embodiment $R^1$, $R^2$, $R^3$ are all hydrogen. In yet a further embodiment however $R^3$ is an alkyl group such as methyl or propyl.

Where X is a group —C(O)O(CH$_2$)$_n$Y—, n is an integer which provides a suitable spacer group. In particular, n is from 1 to 5, preferably about 2.

Suitable sulphonamide groups for Y include those of formula —N(R$^7$)SO$_2$— where R$^7$ is hydrogen or alkyl such as C$_{1-4}$alkyl, in particular methyl or ethyl.

In one embodiment, the compound of formula (I) is a compound of formula (II)

where $R^5$ is as defined above in relation to formula (I).

In compounds of formula (II), X in formula (I) is a bond.

However in a preferred embodiment, the compound of formula (I) is an acrylate of formula (III)

where n and $R^5$ as defined above in relation to formula (I) and $R^7$ is hydrogen, C$_{1-10}$ alkyl, or C$_{1-10}$haloalkyl. In particular $R^7$ is hydrogen or C$_{1-6}$alkyl such as methyl. A particular example of a compound of formula (III) is a compound of formula (IV)

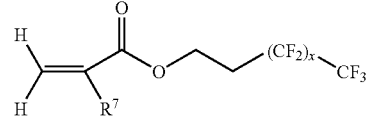

where $R^7$ is as defined above, and in particular is hydrogen and x is an integer of from 1 to 9, for instance from 4 to 9, and preferably 7. In that case, the compound of formula (IV) is 1H,1H,2H,2H-heptadecafluorodecylacylate.

In a further aspect, the invention provides a method for protecting an electrical or electronic device against liquid damage said method comprising exposing said device to a pulsed plasma comprising a compound of formula (I)

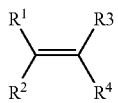
(I)

where $R^1$, $R^2$ and $R^3$ are independently selected from hydrogen, alkyl, haloalkyl or aryl optionally substituted by halo; and $R^4$ is a group X—$R^5$ where $R^5$ is an alkyl or haloalkyl group and X is a bond; a group of formula —C(O)O(CH$_2$)$_n$Y— where n is an integer of from 1 to 10 and Y is a bond or a sulphonamide group; or a group —(O)$_p$R$^6$(O)$_q$(CH$_2$)$_t$— where $R^6$ is aryl optionally substituted by halo, p is 0 or 1, q is 0 or 1 and t is 0 or an integer of from 1 to 10, provided that where q is 1, t is other than 0,
in a gaseous state for a sufficient period of time to allow a protective polymeric layer to form on the surface of the electrical or electronic device.

Liquid damage from which these devices are protected include environmental liquids such as water and in particular rain, or any other liquid, which may be accidentally spilled onto the device.

Suitably, the electrical or electronic device is placed in a plasma deposition chamber, a glow discharge is ignited within said chamber, and a voltage applied as a pulsed field.

Suitable monomers and reaction conditions for use in this method are as described above.

The invention will now be particularly described by way of example.

EXAMPLE 1

Microphones

A set of 100 microphones were placed into a plasma chamber with a processing volume of ~300 liters. The chamber was connected to supplies of the required gases or vapours, via a mass flow controller and/or liquid mass flow meter and a mixing injector or any other vapour/gas introduction mechanism as appropriate. The chamber was evacuated to between 3-10 mtorr base pressure before allowing helium into the chamber at 20 sccm until a pressure of 80 mtorr was reached. A continuous power plasma was then struck for 4 minutes using RF at 13.56 MHz at 300 W.

After this period, 1H,1H,2H,2H-heptadecafluorodecylacylate (CAS #27905-45-9) of formula

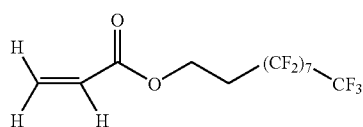

was brought into the chamber at a rate of 120 milli grams per minute and the plasma switched to a pulsed plasma at 30 micro seconds on-time and 20 milli seconds off-time at a peak power of 100 W for 40 minutes. On completion of the 40 minutes the plasma power was turned off along with the processing gases and vapours and the chamber evacuated back down to base pressure. The chamber was then vented to atmospheric pressure and the microphone heads removed.

It was found that the microphone heads were covered with an water and oil-repellent that protected it from challenge with water.

The invention claimed is:
1. A method for protecting an electrical or electronic device against liquid penetration through its external surface, wherein the external surface is not water-tight and is not in a water-tight relationship with an adjacent external surface so that the device is liquid permeable, comprising
providing at least all liquid permeable portions of the external surface of the electrical or electronic device with a plasma-derived, polymeric, gas-permeable, liquid-repellent nano-coating, wherein the coating is formed by a process comprising
a) prior to exposing the electrical or electronic device to the polymerizable monomer of step b), exposing at least all liquid permeable portions of the external surface of the device to a continuous power plasma, thereby ensuring that the monomer is attached to the surface during step b);
b) then exposing at least all liquid permeable portions of the external surface of the device to a pulsed plasma comprising a polymerizable gaseous monomer to allow a polymeric layer to form from the polymerizable monomer having a formula (I)

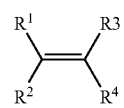
(I)

where $R^1$, $R^2$ and $R^3$ independently are selected from hydrogen, alkyl, haloalkyl or aryl optionally substituted by halo; and $R^4$ is a group XR$^5$ where $R^5$ is a fluoroalkyl group and X is a bond; or X is a group of formula C(O)O(CH$_2$)$_n$Y where n is an integer of 1 to 10 and Y is a bond or a sulphonamide group; or X is a group (O)$_p$R$^6$(O)$_q$(CH$_2$)$_t$ where $R^6$ is aryl optionally substituted by halo, p is 0 or 1, q is 0 or 1 and t is 0 or an integer of 1 to 10, provided that where q is 1, t is other than 0, and
c) thereby preventing liquid penetration of the external surface of the device without adversely affecting at least one of the intended performance or operation of the device.

2. The method of claim 1, wherein the plasma is applied at a power of 40 W to 500 W.

3. The method of claim 1, wherein the power is pulsed in a sequence in which the ratio of the time on to time off is 1:500 to 1:1500.

4. The method of claim 3, wherein the power is pulsed in a sequence where power is on for 20 μs to 50 μs, and off for 1000 μs to 30000 μs.

5. The method of claim 1, wherein the power is applied as a pulsed field for a period of 30 seconds to 90 minutes.

6. The method of claim 1, wherein step a) is conducted in the presence of an inert gas.

7. The method of claim 1, wherein the polymerizable monomer of formula (I) is a polymerizable monomer of formula (II)

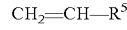
$CH_2$=CH—$R^5$ (II)

where $R^5$ is a fluoroalkyl group, or the polymerizable monomer of formula (I) is a polymerizable monomer of formula (III)

$$CH_2=CR^7C(O)O(CH_2)_nR^5 \qquad (III)$$

where n is an integer of 1 to 10; $R^5$ is a fluoroalkyl group and $R^7$ is hydrogen, $C_{1\text{-}10}$alkyl, or $C_{1\text{-}10}$haloalkyl.

8. The method of claim 7, wherein the polymerizable monomer of formula (III) is a polymerizable monomer of formula (IV)

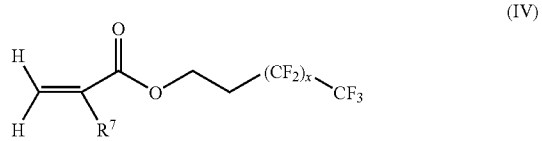

(IV)

where $R^7$ is hydrogen, $C_{1\text{-}10}$ alkyl, or $C_{1\text{-}10}$haloalkyl and x is an integer of 1 to 9.

9. The method of claim 8, wherein the polymerizable monomer of formula (IV) is 1H,1H,2H,2H-heptadecafluorodecylacrylate.

10. A method for preventing liquid penetration through an external surface of an electrical or electronic sound or audio device comprising a transducer, wherein the device further comprises an externally exposed surface that is not itself at least one of itself water-impermeable or in a water-tight relationship with an adjacent externally exposed surface by providing at least all liquid permeable portions a portion of the external surface of the electrical or electronic device with a plasma-derived, polymeric, gas-permeable, liquid-repellent nano-coating, wherein the coating is formed by a process comprising a) prior to exposing the electrical or electronic device to the polymerizable monomer of step b), exposing at least all liquid permeable portions of the external surface of the device to a continuous power plasma, thereby ensuring that the monomer is attached to the surface during step b);

b) then exposing at least all liquid permeable portions of the external surface of the device to a pulsed plasma comprising a gaseous polymerizable monomer time for a nano-coating to form on the exposed external surface of the electrical or electronic device, wherein the pulsed plasma forms the nano-coating by polymerization of the polymerizable monomer of formula (I)

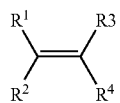

(I)

where $R^1$, $R^2$, and $R^3$ are independently selected from hydrogen, alkyl, haloalkyl or aryl optionally substituted by halo; and $R^4$ is a group $XR^5$ where $R^5$ is a fluoroalkyl group and X is a bond; or X is a group of formula $C(O)O(CH_2)_nY$ where n is an integer of 1 to 10 and Y is a bond or a sulphonamide group; or X is a group $(O)_pR^6(O)_q(CH_2)_t$ where $R^6$ is aryl optionally substituted by halo, p is 0 or 1, q is 0 or 1 and t is 0 or an integer of 1 to 10, provided that where q is 1, is other than 0; and c) thereby preventing liquid penetration of the external surface of the device without adversely affecting at least one of the intended performance or operation of the device.

11. The method of claim 1, wherein the electrical or electronic device is selected from the group consisting of a ringer, a buzzer, a hearing aid, personal audio equipment, a television, a DVD player, a video recorder, a set-top box and a computer.

12. The method of claim 10, wherein the electrical or electronic device is selected from a microphone and a loudspeaker.

13. The method of claim 12, wherein at least one of the selected microphone or loudspeaker comprises at least one of an outer casing or a foam cover or foamed plastic, and the polymeric layer is provided thereon.

14. The method of claim 1, wherein the electrical or electronic device is selected from the group consisting of a laptop, notebook or palmtop computer, a personal digital assistant (PDA), a mobile phone, personal audio equipment, a keyboard and a games console.

15. The method of claim 1, wherein the plasma is created with a voltage having an average power of 0.005 W/m$^3$ to 0.5 W/m$^3$.

16. The method of claim 1, wherein the compound of formula (I) in gaseous form is fed into the plasma at a rate of 80 mg/minute to 300 mg/minute while the pulsed voltage is applied.

17. The method of claim 12, wherein the microphone or loudspeaker comprises a diaphragm or membrane transducer, and the polymeric layer is provided thereon.

18. The method of claim 17, wherein the diaphragm or membrane transducer is foamed or is covered with or adjacent at least one of a foam layer or cover, and the polymeric layer is provided thereon.

19. The method of claim 14, wherein the electrical or electronic device comprises at least one external control component that is not itself at least one of water-tight or in a water-tight relationship with each adjacent external surface of the device.

20. The method of claim 19, wherein the external control component is selected from the group consisting of a button and a switch.

21. The method of claim 1, wherein the external surface comprises a control component selected from the group consisting of a button and a switch.

* * * * *

UNITED STATES PATENT AND TRADEMARK OFFICE
CERTIFICATE OF CORRECTION

PATENT NO.         : 9,617,353 B2
APPLICATION NO.    : 12/161181
DATED              : April 11, 2017
INVENTOR(S)        : Stephen Coulson Page 1 of 1

It is certified that error appears in the above-identified patent and that said Letters Patent is hereby corrected as shown below:

On the Title Page

Item (73) Assignee: reading "PZi Limited (GB)" should read --P2i Limited (GB)--.

In the Claims

At Column 9, Claim number 10, Line 44 reading "comprising a gaseous polymerizable monomer time for" should read --comprising a gaseous polymerizable monomer for--.

Signed and Sealed this
Eighteenth Day of July, 2017

Joseph Matal
*Performing the Functions and Duties of the*
*Under Secretary of Commerce for Intellectual Property and*
*Director of the United States Patent and Trademark Office*